(12) United States Patent
Anick et al.

(10) Patent No.: US 7,921,092 B2
(45) Date of Patent: Apr. 5, 2011

(54) TOPIC-FOCUSED SEARCH RESULT SUMMARIES

(75) Inventors: Peter Anick, Marlborough, MA (US); Swati Raju, San Jose, CA (US); Daniel E. Rose, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 299 days.

(21) Appl. No.: 11/633,762

(22) Filed: Dec. 4, 2006

(65) Prior Publication Data
US 2008/0133482 A1  Jun. 5, 2008

(51) Int. Cl.
*G06F 7/00* (2006.01)
(52) U.S. Cl. .......................... 707/705; 707/769
(58) Field of Classification Search .................. None
See application file for complete search history.

(56) References Cited

U.S. PATENT DOCUMENTS

| | | | |
|---|---|---|---|
| 5,708,825 A * | 1/1998 | Sotomayor | 715/205 |
| 5,715,453 A | 2/1998 | Stewart | |
| 5,913,215 A | 6/1999 | Rubinstein et al. | |
| 6,334,132 B1 | 12/2001 | Weeks | |
| 6,349,316 B2 | 2/2002 | Fein et al. | |
| 6,581,057 B1 | 6/2003 | Witbrock et al. | |
| 6,766,287 B1 * | 7/2004 | Kupiec et al. | 704/9 |
| 6,904,564 B1 | 6/2005 | Harris et al. | |
| 6,947,930 B2 | 9/2005 | Anick et al. | |
| 7,406,458 B1 * | 7/2008 | Carson et al. | 707/3 |
| 2002/0120616 A1 * | 8/2002 | Yun et al. | 707/3 |
| 2002/0129014 A1 | 9/2002 | Kim et al. | |
| 2003/0195877 A1 * | 10/2003 | Ford et al. | 707/3 |
| 2006/0026013 A1 * | 2/2006 | Kraft | 705/1 |
| 2006/0173817 A1 * | 8/2006 | Chowdhury et al. | 707/3 |
| 2007/0050393 A1 * | 3/2007 | Vogel et al. | 707/102 |
| 2007/0074108 A1 * | 3/2007 | Xie et al. | 715/517 |

FOREIGN PATENT DOCUMENTS

| | | |
|---|---|---|
| KR | 0170198 B1 | 3/1999 |
| KR | 10-2001-0064269 | 7/2001 |
| WO | WO 0219172 A1 | 3/2002 |

OTHER PUBLICATIONS

Vibhu Mittal et al., "Selecting Text Spans for Document Summaries: Heuristics and Metrics," 1999, American Association of Artificial Intelligence, 7 pgs.
International Searching Authority, "Patent Cooperation Treaty and International Search Report", International application No. PCT/US2007/085520, received May 12, 2008, 12 pages.

* cited by examiner

*Primary Examiner* — Debbie Le
*Assistant Examiner* — Hasanul Mobin
(74) *Attorney, Agent, or Firm* — Hickman Palermo Truong & Becker LLP

(57) ABSTRACT

Techniques for automatically generating and displaying topic-focused summaries for search results are disclosed. Users can "peek" inside a search result to see document excerpts that pertain specifically to a user-selected topic. Thus, a user can view the aspects of a document that are most interesting prior to deciding whether to retrieve the complete document. For each search result, a user can select from among several different available summaries, each of which focuses on a different topic of the document to which that search result refers. According to one aspect, key concepts are automatically identified in a document. For each such key concept, contextual snippets that pertain to that key concept are automatically selected. The key concepts are displayed to the user at search time. A summary that contains the contextual snippets that pertain to a user-selected key concept is displayed in response to the user's selection of that key concept.

26 Claims, 6 Drawing Sheets

2. <u>Transistor</u>
transistor ... PAGE INDEX: Select a transistor topic from the list below or browse
down the page to not miss ... INTRODUCTION - A transistor is a small electronic  ⎫ 102
device that can cause changes ...  ⎭
In this page: <u>transistor, transistor circuits, transistor radio, transistor amplifier, silicon</u>  ⎫ 104
<u>transistor, transistor amplifiers, jfet transistor</u>  ⎭
www.101science.com/transistor.htm

FIG. 1A

2. <u>Transistor</u>
transistor ... PAGE INDEX: Select a transistor topic from the list below or browse
down the page to not miss ... INTRODUCTION - A transistor is a small electronic  ⎫ 102
device that can cause changes ...  ⎭
In this page: <u>transistor, transistor circuits, transistor radio, transistor amplifier, silicon</u>  ⎫ 104
<u>transistor, transistor amplifiers, jfet transistor</u>  ⎭

101science.com is the internet science PORTAL to more than 20,000    ⌧  ⎫
    science sites. This site is FREE! ... For example, very weak radio signals in the  ⎪
    air can be picked up by a wire antenna and processed by transistor amplifiers  ⎬ 106
    until they are strong enough to be heard by the human ear. ... [PDF] Differential  ⎪
    transistor amplifiers. Approach Yields Low-Noise Amplifiers. THE TRANSISTOR  ⎪
    AS A VOLTAGE AMPLIFIER ...  ⎭ www.101science.com/transistor.htm

FIG. 1B

1. Summer Jobs Web
   international listing of seasonal and summer employment opportunities.
   www.summerjobs.com

| Look ahead: | jobs | summer jobs | resort | camps | cruise ship jobs | teen jobs | national parks | ☒ |
|---|---|---|---|---|---|---|---|---|

... Camp Takajo is Hiring Maine Camp Counselors Now! Call 1-800-555-8252 to find out more. ... Camp Takajo Hiring Maine Camp Counselors Now! Call 800.555.8252 to apply today. Lorem ipsum dolor sit amet, consectetuer adipiscing elit. Quisque vulputate quam non metus. Suspendisse potenti. Aliquam ultrices diam eleifend augue.

FIG. 1C

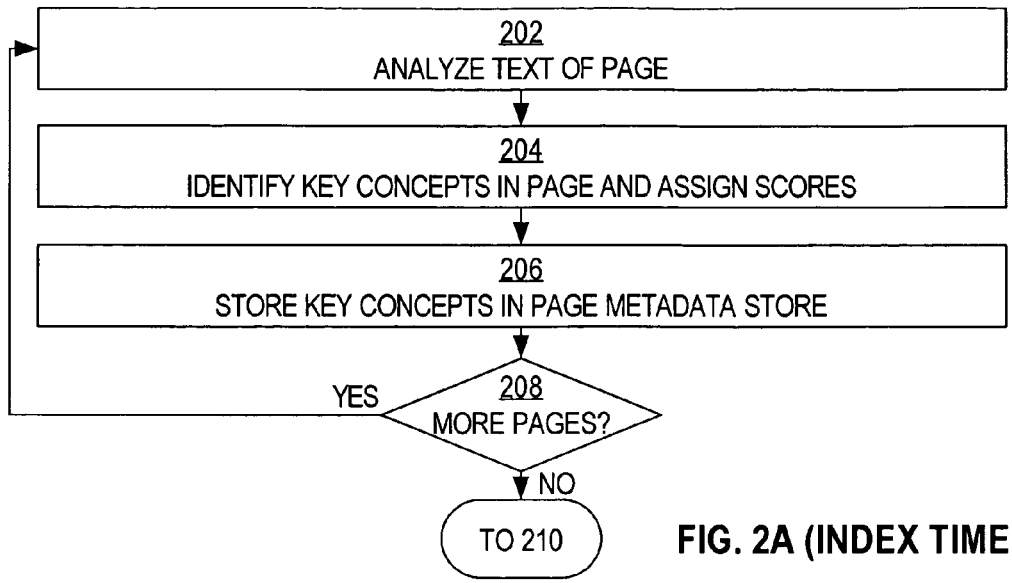
FIG. 2A (INDEX TIME)
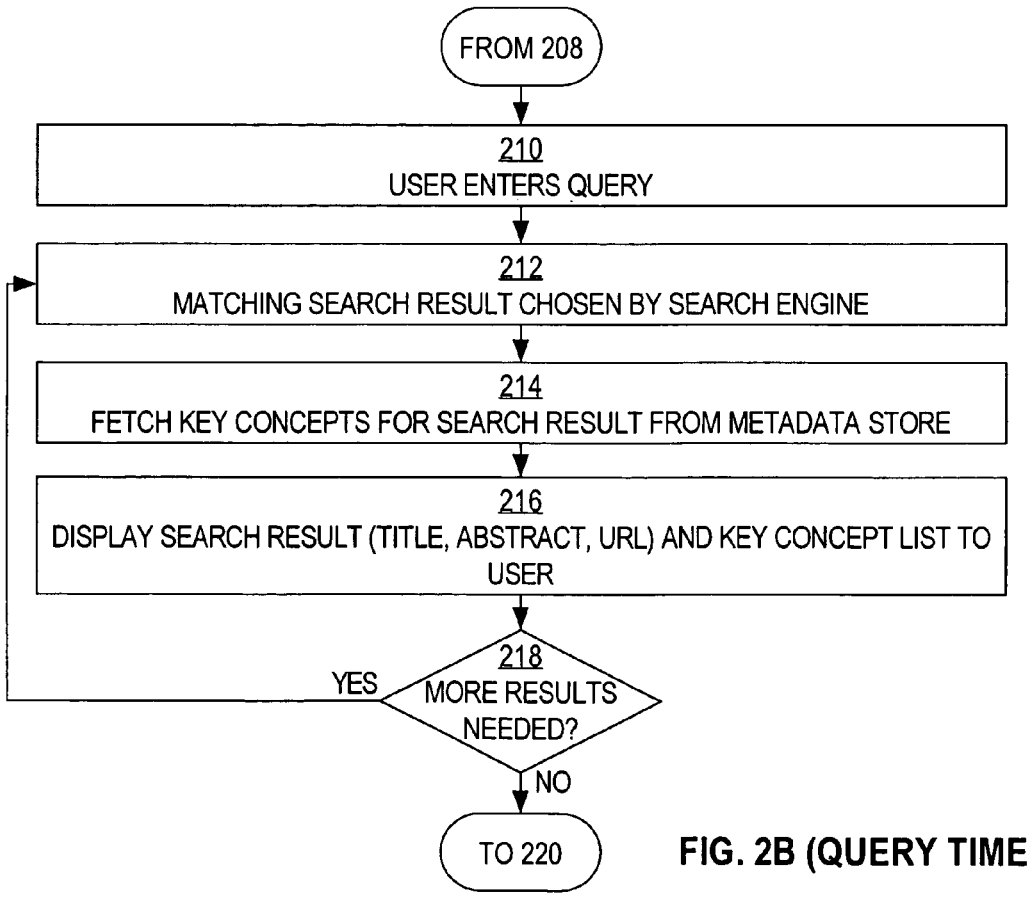
FIG. 2B (QUERY TIME)

TOPIC-FOCUSED SEARCH RESULT SUMMARIES

FIELD OF THE INVENTION

The present invention relates to search engines and, more specifically, to a technique for generating search result summaries that are focused on user-selected topics.

BACKGROUND

When an information retrieval system, such as a web search engine, returns a list of search results, the list of results typically includes a brief summary of the content of each of the results so that the user can decide whether or not to select and read the full content of a particular result. Traditionally, there have been two ways to construct these summaries.

One way to construct a summary involves using a pre-generated abstract that describes the main topics of the document. With technical articles, these abstracts are usually provided by the authors and are often expressly labeled, within the articles, as abstracts. With news articles, the first paragraph of the article is often used as a summary of the whole article. Such an abstract is sometimes called a "static" abstract because, for each set of search results in which the abstract appears, the contents of the abstract remain the same regardless of the submitted query terms (i.e., user-submitted words and/or phrases).

Another way to construct a summary involves selecting, for inclusion within the summary, a part of the result document text in which the user's query terms (also known as "key words") appear. Such a summary is sometimes called a "contextual" or "dynamic" abstract because the contents of the summary for a particular document may differ based on the submitted query terms.

More recently, these two approaches have been combined. Some web search engines generate and display search result summaries that may include, within each summary, both (a) snippets of result document text that contain the query terms in context (i.e., excerpts from a dynamic abstract), and (b) brief excerpts or descriptions of the document as a whole (i.e., excerpts from a static abstract). Summaries that include both excerpts from a static abstract and excerpts from a dynamic abstract are sometimes called "smart abstracts."

There are many instances where even the "smart abstract" approach alone does not provide enough information to a user. The information-seeking process is iterative. Users' information needs often evolve during the search process. Furthermore, different users do not necessarily use the same vocabulary to describe the content for which they are looking. There are often circumstances in which a user would like to learn more about a search result before deciding whether it is worthwhile to click on that result and read the entire contents of the document to which that result corresponds.

Such circumstances frequently occur when the user is accessing a search engine via a small portable device such as mobile phone. The display screen on most mobile phones is so small, and the bandwidth offered by most mobile phones is so narrow, that downloading an entire document and attempting to display that entire document on the display screen is both tedious and expensive in terms of time.

Another problem with existing search result summaries is that they are generated based on a "one size fits all" paradigm. When two different users issue the same query to a search engine, the summaries generated and shown to both users are identical, even though those two users might have completely different intents. For example, two different users might enter the query "digital camera." One user might be shopping, while the other user might want to learn how digital cameras work. The information that the first user would find valuable in a summary for a particular search result likely will be quite different from the information that the second user would find valuable in a summary for that particular search result. What is needed is a solution to the foregoing problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A shows an example of a "listing" in a search results page that includes user-selectable key concept links, the selection of which cause corresponding topic-focused summaries to appear in the "listing," according to an embodiment of the invention;

FIG. 1B shows an example of the "listing" of FIG. 1A in which a topic-focused summary has been placed dynamically below the original summary, according to an embodiment of the invention;

FIG. 1C shows an example of a "tabbed" listing, according to one embodiment of the invention;

FIGS. 2A-C depict an example of a technique for automatically determining key concepts within indexed documents, generating topic-focused summaries for documents referenced within search results, and presenting such topic-focused summaries to a user, in accordance with an embodiment of the invention;

DETAILED DESCRIPTION

Figure 2C:
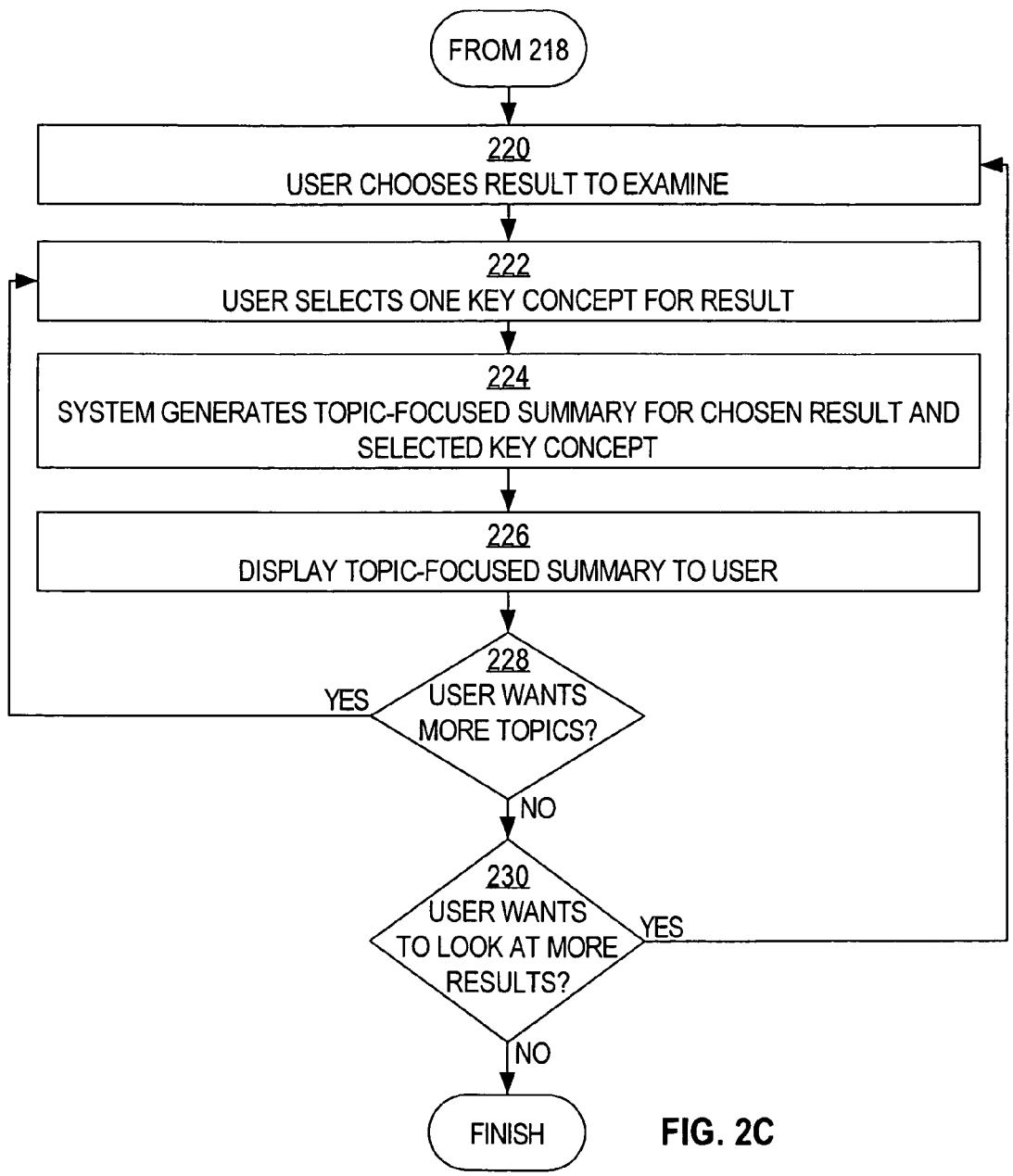

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Embodiments of the invention give users the ability to "peek" inside a search result (shown on an Internet browser-displayed search results page) returned by an Internet search engine to see, within the document to which that search result corresponds, excerpts that pertain specifically to a user-selected topic. Thus, a user can view, exclusively, the aspects of the document that are most interesting to the user prior to deciding whether to direct his browser to retrieve and display the complete document. For each search result, a user can select from among several different available summaries, each of which focuses on a different topic of the document to which that search result refers.

One embodiment of the invention includes (a) a mechanism that automatically identifies, within a document, key concepts that best characterize what the document is about, (b) a summarization system that selects, from the document, for each such key concept, contextual snippets that pertain specifically to that key concept, and (c) a service that (1) creates a user interface in which the key concepts are dynamically displayed to the user at search time, and (2) dynamically displays, in an abstract for the document, the contextual snippets that pertain to a user-selected key concept in response to the user's selection of that key concept.

Identifying Key Concepts within a Document

According to one embodiment of the invention, each document to which a search result refers contains one or more key concepts. Each key concept pertains to a separate topic within the document. In one embodiment of the invention, key concepts within a document are automatically identified and selected using a technology that is disclosed in U.S. Pat. No. 6,947,930, titled "SYSTEMS AND METHODS FOR INTERACTIVE SEARCH QUERY REFINEMENT." In one embodiment of the invention, key concepts within a document are automatically identified and selected using techniques that are disclosed in U.S. patent application Ser. No. 10/903,283, titled "SEARCH SYSTEMS AND METHODS USING IN-LINE CONTEXTUAL QUERIES." U.S. Pat. No. 6,947,930 and U.S. patent application Ser. No. 10/903,283 are incorporated by reference herein. Although the techniques disclosed in U.S. Pat. No. 6,947,930 and U.S. patent application Ser. No. 10/903,283 can be used to automatically identify and select key concepts within a document, other techniques additionally or alternatively may be used to identify and select key concepts within a document; the techniques disclosed in U.S. Pat. No. 6,947,930 and U.S. patent application Ser. No. 10/903,283 are only one example.

Essentially, the technology disclosed in U.S. Pat. No. 6,947,930 includes a term extraction mechanism that automatically selects terms (i.e., words and/or phrases) that are most representative of a document's content. The technology uses a combination of statistical, lexical, and document structural heuristics to select the terms. Web search engines typically operate in conjunction with an automated "web crawler" component that searches the Internet for documents and then indexes those documents so that those documents can be queried efficiently later. For query-time efficiency, the key concepts within a document can be extracted at document-indexing time and stored in an index as document metadata that can be fetched at query-time. In one embodiment of the invention, the extracted concepts are represented in "concept vectors," which are ordered lists of words and/or phrases with associated scores that indicate how well those words and/or phrases represent what the document is about.

Although much of the discussion herein is presented in the context of web search engines specifically for sake of example, embodiments of the invention are not limited in their application to web search engines alone. Embodiments of the invention may be applied to search engines other than web search engines. For example, some embodiments of the invention may be applied in the context of an information retrieval system that retrieves documents (e.g., e-mail messages, files, etc.) that are present on any computing device (including a user's own computer) using any of a variety of applications-even applications other than Internet browser applications.

Selecting Contextual Snippets for a Key Concept

A contextual snippet is a contiguous portion of a document (smaller in size than the entire document) that contains a specified key concept. For example, a contextual snippet might comprise a sentence or a portion thereof. In one embodiment of the invention, contextual snippets within a document are automatically selected by a "smart abstract" system. Such a system and an approach used by such a system are described in U.S. patent application Ser. No. 10/365,273, titled "GENERATING DESCRIPTIONS OF MATCHING RESOURCES BASED ON THE KIND, QUALITY, AND RELEVANCE OF AVAILABLE SOURCES OF INFORMATION ABOUT THE MATCHING RESOURCES." U.S. patent application Ser. No. 10/365,273 is incorporated by reference herein.

Essentially, the approach used by the "smart abstract" system is as follows. When documents are indexed, the text of those documents is extracted and stored in a form called a digest. The digest contains metadata that indicates the start and end positions of sentences and other boundaries. At search time, if the search engine has chosen a document to be referenced within a list of search results, that document's digest is automatically searched to find sentences that contain the query terms. These sentences become candidate snippets for the original query term-based summary that will be displayed for the document. The candidate snippets are scored using various criteria (e.g., the number of query terms that appear in the candidate snippet) and shortened, merged, or extended as needed. High-scoring snippets are then automatically chosen to be combined, automatically, into a final query term-based "smart abstract" for the document.

According to an embodiment of the invention, instead of or in addition to finding sentences that contain the query terms, the search engine finds sentences that contain a particular key concept. These sentences become the candidate snippets for a topic-focused summary that may be displayed for the document instead of or in addition to the original query term-based summary. Such candidate snippets may be scored, modified in length, and selected for inclusion within the topic-focused summary using techniques similar to those described above.

Topic-focused summaries may, but do not need to, contain the query terms. Topic-focused summaries may be generated based on a combination of a static abstract and a dynamic abstract (i.e., portions that contain and surround the key concepts), or based on the dynamic abstract alone; material from a static abstract does not need to be included in the topic-focused summaries. In one embodiment of the invention, material from static abstracts is deliberately omitted from topic-focused summaries unless that material is also contained in a dynamic abstract.

Inasmuch as a document may contain multiple different key concepts, multiple different topic-focused summaries may be generated for each document. In one embodiment of the invention, if there are more than a specified number of key concepts within a document, then topic-focused summaries for only a specified number of the most significant (as determined based on specified ranking criteria) key concepts in that document are generated. In one embodiment of the invention, topic-focused summaries are created on demand (e.g., in response to a user's request for such a summary).

Topic-Oriented User Interface

In one embodiment of the invention, the service that controls the search engine's user interface performs the following operations. When the service requests, from the search engine, the search results for user-submitted query terms, the service also requests the key concepts that were identified for each search result as discussed above. The service receives, from the search engine, a list of search results, and, for each search result, a set of key concepts.

In one embodiment of the invention, for each search result, the service displays the key concepts for that search result within separate hypertext links. Each link is created such that the user's action of clicking on the link generates a request for a different topic-focused summary that is focused on the selected key concept rather than the original query terms. This topic-focused summary is then displayed instead of, or in addition to, the original summary for the search result. In one embodiment of the invention, this updating of the display happens asynchronously, without the search results page being reloaded by the user's Internet browser. From the user's perspective, the topic-focused summary is displayed instantaneously in response to the user's selection of a key concept link to which that topic-focused summary corresponds.

Displaying Topic-Focused Summaries

As is discussed above, for each search result "listing" shown on a search results page, a separate set of key concepts for that search result "listing" may be displayed in connection with that search result "listing." A user's selection of a particular key concept for a particular search result "listing" causes a topic-focused summary that was generated based on the particular key concept to be displayed. However, there are multiple different way in such a topic-focused summary might be displayed.

In one embodiment of the invention, when a user selects a key concept, the topic-focused summary that corresponds to that key concept replaces an original query term-based summary in the search results page that the user is currently viewing. In other words, the topic-focused summary is displayed in the same area that used to be occupied by the query term-based summary. Within the topic-focused summary, each instance of the key concept to which that topic-focused summary corresponds may be visibly distinguished (e.g., bolded, italicized, underlined, highlighted, and/or differently colored) from the rest of the text in that summary.

In an alternative embodiment of the invention, instead of replacing the original query term-based summary, the topic-focused summary appears beside or below the original summary. Thus, one or more topic-focused summaries might be displayed simultaneously with an original non-topic-focused summary for a given search result.

FIG. 1A shows an example of a "listing" in a search results page that includes user-selectable key concept links 104, the selection of which cause corresponding topic-focused summaries to appear in the "listing," according to an embodiment of the invention. The summary currently shown in the "listing" is a query term-based summary 102 that was generated based on the submitted query term "transistor." Key concept links 104 include links for key concepts such as "transistor," "transistor circuits," "transistor radio," "transistor amplifier," "silicon transistor," "transistor amplifiers," and "jfet transistor." The web page to which the "listing" corresponds was automatically determined to pertain to, or to be about, these key concepts.

FIG. 1B shows an example of the "listing" of FIG. 1A in which a topic-focused summary 106 has been placed dynamically below the original summary, according to an embodiment of the invention. To see topic-focused summary 106, the user has selected the "transistor amplifiers" key concept. Topic-focused summary 106 includes excerpts of the corresponding web page that contain the "transistor amplifiers" term. In topic-focused summary 106, occurrences of the user-selected key concept are highlighted.

In one embodiment of the invention, the topic-focused summary for a particular search result is shown as a single item. In an alternative embodiment of the invention, in conjunction with each search result, a set of side-by-side "folder tabs" is displayed above a summary display area, with each tab specifying a different key concept identified in the document to which that search result refers. When a user clicks on a particular folder tab, the summary display area responsively transitions to display the topic-focused summary that corresponds to the particular folder tab's key concept. Thus, in one embodiment of the invention, each tab appears to correspond to a different folder in a stack of overlapping folders, and the user's selection of a particular tab appears to move the folder to which that tab corresponds to the forefront of the stack, thereby making that folder's topic-focused summary visible to the user. FIG. 1C shows an example of a "tabbed" listing, according to one embodiment of the invention. Each "tab" indicates a separate key concept for the listing. As shown in FIG. 1C, the user has selected the "camps" tab, thereby causing a "camps" topic-focused summary to appear for the "listing." The tabs shown in FIG. 1C essentially provide the same functionality as is provided by key concepts links 104 in FIGS. 1A and 1B, but in a different graphical interface.

Example Topic Extraction Techniques

As is discussed above, in one embodiment of the invention, the document excerpts to be included in a topic-focused summary for that document are selected based on whether those excerpts contain a particular key concept. However, in various embodiments of the invention, different topic extraction techniques may be used. For example, rather than (or in addition to) finding the key concepts to which a document pertains, automated extraction techniques might find specified types of information using pattern recognition approaches and/or dictionaries. For example, instead of or in addition to locating the key concepts in a document, an automated extraction mechanism might locate names of people, places, phone numbers, street addresses, e-mail addresses, uniform resource locators, etc. Special summaries that contain these specified types of information, and the text closely surrounding (for purposes of context), may be automatically generated and presented within a search results page to a user.

Example Flow

FIGS. 2A-C depict an example of a technique for automatically determining key concepts within indexed documents, generating topic-focused summaries for documents referenced within search results, and presenting such topic-focused summaries to a user, in accordance with an embodiment of the invention. Reference is first made to FIG. 2A, which illustrates steps that are performed at index time. The steps illustrated in FIG. 2A may be performed for each page in a set of pages. In block 202, the text of a page (e.g., a web page discovered on the Internet by an automated web-crawling mechanism) is analyzed.

In block 204, key concepts in the page are automatically identified and scores are assigned to those key concepts. For example, an automated mechanism such as a computer program may use the technology of techniques disclosed in U.S. Pat. No. 6,947,930, discussed above, may be used to identify multiple key concepts to which the page pertains. Other techniques additionally or alternatively may be used to identify key concepts to which the page pertains. For example, one or more key concepts within a document may be pre-identified as key concepts for that document by the document's own author—the key concepts may be identified through metadata contained within the document. The page may be indexed based on each of the associated key concepts. In one embodiment of the invention, the key concepts are the same as the concept vectors discussed above.

In block 206, the key concepts are stored in a page metadata store (the metadata in the page metadata store is not necessarily the same as or even related to the metadata contained within the document as discussed above). In block 208, a determination is made as to whether any more pages, for which key concepts have not yet been identified, are contained in the set of pages. If more of such pages remain, then control passes back to block 202. Otherwise, the technique illustrated with in FIG. 2A is complete, and the technique illustrated with in FIG. 2B may be performed, beginning at block 210, at a later time. FIG. 2B illustrates a technique that might be performed by a process and/or machine that is entirely separate from a process and/or machine that performs the technique illustrated in FIG. 2A, and which might be performed much later than the technique illustrated in FIG. 2A.

Reference is now made to FIG. 2B, which illustrates steps that are performed at query time. In block 210, a user enters a search query. The search query comprises one or more query terms, and may be received from a user's Internet browser. For example, a search engine may receive the query terms that the user's Internet browser (e.g., Mozilla Firefox) sent toward the search engine over the Internet.

Steps 212-216 may be performed for each matching search result in a set of matching search results. In block 212, a matching search result is chosen based on the query terms and information about the pages that have been discovered. For example, based on data that the web crawling mechanism previously stored, the search engine may identify a document that is relevant in light of the query terms (e.g., a document that contains the query terms), and generate a search result listing that refers to the identified document.

In block 214, the key concepts for the search result are fetched from the page metadata store. In block 216, the search result and the key concepts associated with that search result are displayed to the user who entered the search query terms. For example, a query term-based "smart abstract" may be automatically generated for each page to which a search result refers. For example, the search engine may generate such a query term-based "smart abstract" using techniques described above; specifically, the search engine may generate a summary that includes snippets of a page that contain the query terms and text closely surrounding those query terms.

In block 218, a determination is made as to whether more search results are needed. If more search results are needed, then control passes back to block 212. Otherwise, control passes to block 220 of FIG. 2C. By repeatedly performing the operations of blocks 212-218 for as many search results as are to be shown to the user at a time (e.g., ten search results), the search engine may automatically generate a search results page. The search results page may contain search result listings for at least some of the search results (typically ranked by relevance), and, for each search result listing, the query term-based "smart abstract" that was generated for that search result. For each search result listing, the search result page may identify one or more key concepts that were previously identified for the document to which that search result corresponds. After generating the search results page, the search engine may send the search results page toward the user's Internet browser over the Internet.

Referring now to FIG. 2C, in block 220, the user chooses (e.g., from the search results page) a search result to examine.

In block 222, the user selects one key concept from potentially several key concepts displayed for the chosen search result. In one embodiment of the invention, the user's choice of a search result and key concept causes the user's Internet browser to send an asynchronous request for a topic-focused summary, which is (a) for the user-chosen search result and (b) based on the user-chosen key concept, to a server via the Internet.

In block 224, the system (e.g., the server that received the asynchronous request) automatically generates a topic-focused summary for the document to which the user-chosen search result corresponds based on the user-selected key concept. For example, the server may generate the topic-focused summary using techniques described above. The server may generate a summary that includes snippets of a web page that contain the selected key concept and text closely surrounding the selected key concept. Thus, the topic-focused summary may be generated based on the selected key concept, without regard to the query terms.

In block 226, the topic-focused summary is displayed to the user. For example, the server may send the topic-focused summary asynchronously toward the user's Internet browser over the Internet. The user's Internet browser's receipt of the topic-focused summary does not cause the user's Internet browser to reload the page or request any page from the server. Instead, the receipt of the topic-focused summary causes the user's Internet browser to (a) replace the text of the appropriate query term-based summary with the text of the topic-focused summary or (b) display the text of the topic-focused summary in close proximity to the appropriate query term-based summary. This may be accomplished by the execution of script language instructions contained in the search results page.

In block 228, a determination is made as to whether the user wants to view more topics for the chosen search result. If the user wants to view more topics, then control passes back to block 222. Otherwise, control passes to block 230.

In block 230, a determination is made as to whether the user wants to look at more search results. If the user wants to look at more search results, then control passes back to block 220. Otherwise, the technique illustrated with reference to FIGS. 2A-C is finished.

Mobile Device Considerations

Sometimes, a user access Internet search engines from Internet browsers that are executing on their personal computers. However, sometimes users access Internet search engines from Internet browsing applications that are executing on their mobile devices. As used herein, the term "mobile device" includes portable devices that communicate with other devices wirelessly. Mobile devices include cell phones, personal digital assistants, laptop computers, and global positioning systems, for example. Mobile devices may communicate with the Internet through a Wireless Application Protocol (WAP) gateway. Because mobile devices are designed to be portable, mobile devices are typically smaller and lighter in weight than personal computers. The small sizes of some mobile devices constrain the areas of the displays of those mobile devices. Some mobiles devices, such as cell phones, have displays that are only a few square centimeters in area.

Additionally, mobile devices often are not able to use the exact same suite of communication protocols that personal computers can use. The protocols that a mobile device uses often necessitate the establishment of a new connection (which can involve the time-consuming negotiation of connection parameters) each time that the mobile device requests a different set of data. Therefore, where mobile devices are involved, it is often better to transmit a single unit of data in response to a single request instead of transmitting several separate units of data in response to each of several separate requests. This avoids the time-consuming establishment of a series of connections. In one embodiment of the invention, if the device to which the search engine is to send the search results page is a mobile device, then the search results page is generated to include fewer search result listings (e.g., five instead of ten) than otherwise would have been included on that page.

Many pages on the World Wide Web are not optimized for mobile viewing. Users of mobile devices may find that scrolling and browsing such pages on a mobile device is inconvenient. Also, requests for web pages often result in the delivery of content that the user has not specifically requested—especially advertising and some or all images. Therefore, providing a mobile device user with the ability to obtain topic-focused summaries for a page to which a search result refers without forcing the user to navigate to (i.e., request the download of) that page is of great value.

Mobile device users typically have different interests than users of fixed or desktop devices. Mobile device users are more likely to have more immediate and goal-directed intentions than desktop web-browsing users. Mobile device users often intend to discover specific pieces of information that are relevant to a specific context without actually browsing an entire page to which a search result listing refers.

In one embodiment of the invention, if the device to which the search engine is to send the search results page is a mobile device, then more detailed summaries are generated and sent to the device in order to reduce the user's need to download an entire page to the mobile device; the user might be able to glean sufficient useful information about a search result from the summary of a page and avoid needing to request that page. However, in an alternative embodiment of the invention, more detailed summaries are not sent to mobile devices as described above.

In one embodiment of the invention, if the device to which the search engine is to send the search results page is a mobile device, then all (or a specified quantity) of the topic-focused summaries for all of the search results on the search results page are generated and stored within the search results page (e.g., as hidden text) before the search results page is sent to the device. For example, the search engine may generate all of the topic-focused summaries for all of the search results within a search results page, place these topic-focused summaries within hidden text in the search results page, and also place, within the search results page, browser-executable script that causes particular topic-focused summaries to become visible in response to a user's selection of corresponding key concept links in the search results page. Thus, in one embodiment of the invention, all of the topic-focused summaries for a particular search results page are sent to the mobile device in one transmission from the search engine; the mobile device does not need to send a separate asynchronous request for each topic-focused summary.

In one embodiment of the invention, when a user of a mobile device selects a link to a document referenced in a search results page while a particular topic-focused summary for that document is being displayed in the search results page, the request that is consequently sent to the search engine specifies that the portion of the document that should be displayed when the document is received is a portion that was shown in the particular topic-focused summary. Beneficially, the mobile device user is automatically shown the part of the document that is probably of most interest to the user. The user is spared from having to scroll down, tediously, to that part.

A search engine may automatically determine whether a request for search results originated from a mobile device, and customize the response accordingly based on this determination as described above. For example, the search engine may determine from a client identifier whether the request for search results came through a mobile gateway, in which case the request originated from a mobile device. Additionally, the search engine may automatically detect the kind of mobile device from which the request came, and customize the response based on the mobile device's kind. For example, the search engine may customize the search results page based on the known display size of the kind of mobile device from which the request originated.

Figure 3D:
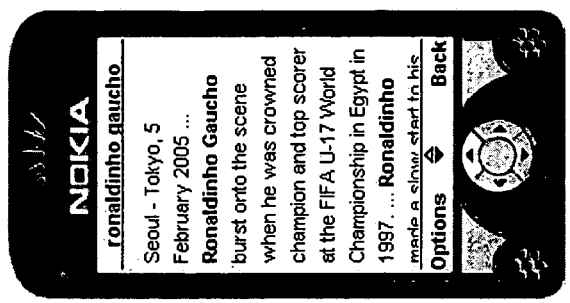
FIGS. 3A-D illustrate various states of a mobile telephone on which an embodiment of the invention is being used.
Figure 3C:
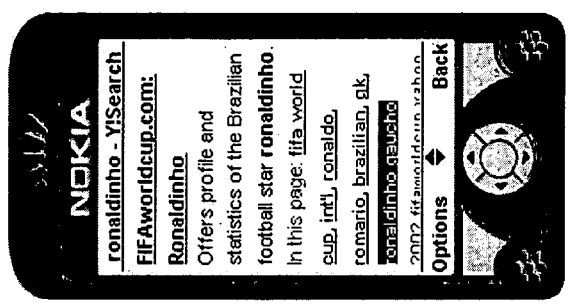
Figure 3B:
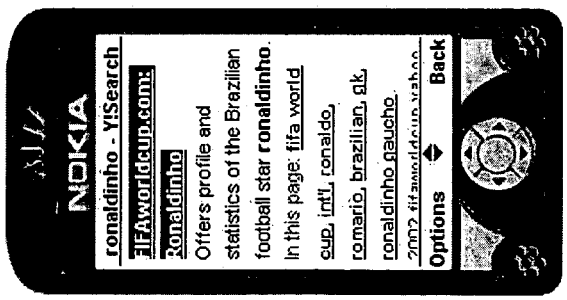
Figure 3A:
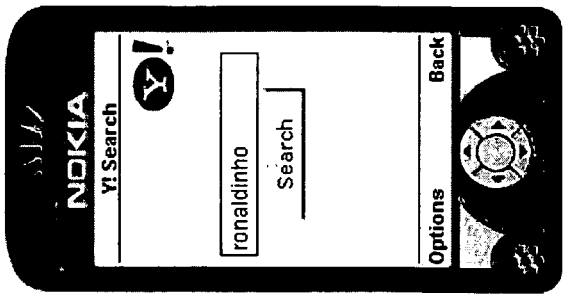

FIGS. 3A-D illustrate various states of a mobile telephone on which an embodiment of the invention is being used. In FIG. 3A, the mobile telephone displays a search engine user interface. The user interface includes a text entry field into which the telephone's user can enter one or more search query terms. In this particular example, the telephone's user has entered the search query term "ronaldinho." In FIG. 3B, the mobile telephone displays data that the search engine has returned to the mobile phone in response to the submission of the search query terms to the search engine. The displayed data shows a particular search result that pertains to "FIFA-worldcup.com: Ronaldinho." The displayed data also shows, as user-selectable links, the top key concepts that are associated with this search result: "fifa world cup," "int'l," "ronaldo," "romario," "brazilian," "gk," and "ronaldinho gaucho." Each of these key concepts identifies a different topic to which the page to which the search result refers pertains. The telephone's user may select a topic in which he is interested. In FIG. 3C, the key concept "ronaldinho gaucho" is highlighted as a result of the telephone's user selecting that key concept from among the several key concepts displayed. In FIG. 3D, the mobile telephone displays a topic-focused summary that is generated based on the selected key concept "ronaldinho gaucho." In this topic-focused summary, the terms "Ronaldinho" and "Ronaldinho Gaucho" are bolded, because these are the terms that correspond to the user-selected key concept. In one embodiment of the invention, this topic-focused summary already has been sent to the mobile telephone prior to the time that the user selects any of the key concepts. The user's selection of a particular key concept causes the corresponding already-received topic-focused summary for the particular key concept to be displayed.

Prisma Technology

As is discussed above, the technology disclosed in U.S. Pat. No. 6,947,930 includes a term extraction mechanism that automatically selects terms (i.e., words and/or phrases) that are most representative of a document's content. The technology uses a combination of statistical, lexical, and document structural heuristics to select the terms. The selected terms become the "key concepts" of the document. Described below are examples of techniques that may be used, in one embodiment of the invention, to select or extract key concept terms from a document. Collectively, these techniques are referred to herein as "the Prisma technology."

In one embodiment of the invention, a set of candidate terms associated with a document is constructed by comparing a term in the document to a master list of candidate terms. When the term is in the master list of candidate terms, the term is added to the set of candidate terms associated with the document as a candidate term. In one embodiment of the invention, the master list of candidate terms includes more than 10,000,000 candidate terms. This comparing is repeated until a maximum number of terms in the document have been considered or a threshold number of unique terms have been considered. Then a weighting and/or selection function is applied to the set of candidate terms to produce a set of ranked candidate terms. Typically, this weighting and/or selection function ranks the candidate terms and then applies a cutoff in which only high ranked terms are retained. In one embodiment of the invention, the master list of candidate terms is optimized for a specific language (e.g., English, Spanish, French, German, Portuguese, Italian, Russian, Chinese, or Japanese). In one embodiment of the invention, each document in all or a portion of the documents in the initial group of ranked documents is in the same language for which the master list of candidate terms has been optimized.

In one embodiment of the invention, each document in a document index is classified at a time prior to the query process (e.g., during initial document indexing). In one embodiment of the invention, there are two possible classes, a first family friendly class and a second non-family friendly class. A designation of the classification of the document is included in the document index.

In one embodiment of the invention a single-word candidate term in a set of ranked candidate terms that is in fact a subset (substring) of a more complex term in the set of ranked candidate terms is discarded. Further, the more complex term is given credit for the number of instances the simpler term appeared in all or the upper portion of the document associated with the set of ranked candidate terms. This discarding and crediting is repeated until there is no single-word candidate term that is a subset of a more complex candidate term in the set of ranked candidate terms. Furthermore the same procedure may be applied to multi-word candidate terms that are subsets of more complex terms.

In one embodiment of the invention, a candidate term in a set of ranked candidate terms that is an orthographic or inflectional variant of a second term in the set of ranked candidate terms is discarded. Further, the second term is given credit for the number of instances the orthographic or inflectional variant term appeared in all or the upper portion of the document associated with the set of ranked candidate terms. This discarding and crediting is repeated until there is no term that is an orthographic or inflectional variant of another term in the set of ranked candidate terms. In some instances, the second term is rewritten in the candidate set as a combined term that includes both (e.g., multiple) orthographic or inflectional variants, with the variant that appeared most in all or an upper portion of the associated document appearing first in the combined term. In one embodiment of the invention, when the combined term is selected for inclusion in the subset of candidate terms presented, only the first portion of the combined term is presented to the user.

Some embodiments of the present invention provide various selection functions that are used to select the subset of candidate terms to be presented in response to a query. In one embodiment of the invention, this selection function takes advantage of the information that is found in the sets of candidate terms associated with top-ranked documents in the initial group of ranked documents. This information includes two forms of ranking. First, the documents are ranked. Second, each candidate term in each set of ranked candidate terms associated with a document in the initial group of ranked documents is ranked.

In one embodiment, the selection function comprises: (i) applying a weighting function to each candidate term in each respective set of ranked candidate terms that is associated with a top-ranked document in the initial group of ranked documents. As used herein, each top-ranked document in the initial group of ranked documents is a document that has a rank that is numerically less than some threshold ranking (e.g. 50, that is, the top-ranked document is in the top 50 documents in the initial group of ranked documents returned for the query). For example, consider the case in which the initial group of ranked documents includes 100 documents and the threshold ranking is fifty. Then, the first fifty documents will be considered top-ranked documents. Those candidate terms receiving a highest weight are included in the subset of candidate terms that are presented along with the query results. In one embodiment of the invention, the weight that is applied to a candidate term by the weighting function is determined in accordance with a number of sets of candidate terms associated with top-ranked documents that the candidate term appears in, the average position of the candidate term in each such set of ranked candidate terms, by whether a term in the received query is in the candidate term, by a number of characters in the candidate term, or by the average rank position of the top-ranked documents that include the term in an associated set of candidate terms. In one embodiment of the invention, the weight that is applied to a candidate term by the weighting function is determined in accordance with any combination or any weighted subset of TermCount, TermPosition, ResultPosition, TermLength, and QueryInclusion, where TermCount is the number of sets of ranked candidate terms that both (i) include the candidate term and (ii) are respectively associated with a top-ranked document, TermPosition is a function (e.g., an average) of the position of the candidate term in those sets of ranked candidate terms that both (i) include the candidate term and (ii) are respectively associated with a top-ranked document, ResultPosition is a function (e.g., an average) of the rank of those top-ranked documents that are associated with a set of ranked candidate terms that includes the candidate term, TermLength is a number of characters in the candidate term (candidate term complexity), and QueryInclusion is a value that indicates whether a term in the received query is in the candidate term.

In one embodiment of the invention, the weight that is applied to a candidate term by the weighting function is determined in accordance with the formula:

$$TermCount+TermPosition+ResultPosition+TermLength+QueryInclusion$$

In one embodiment of the invention, TermCount, TermPosition, ResultPosition, TermLength, and QueryInclusion are each independently weighted. In one embodiment of the invention, the weight that is applied to a candidate term by the weighting function is determined in accordance with the formula:

$$(TermCount*w_1)+(TermPosition*(w_2+(RefinementDepth*w_2')))+(ResultPosition*w_3)+(TermLength*(w_4+(RefinementDepth*w_4')))+(QueryInclusion*(w_5+(RefinementDepth*w_5')))$$

where $w_1$, $w_2$, $w_3$, $w_4$, $w_5$, $w_2'$, $w_4'$, and $w_5'$ are independent weights and RefinementDepth is a number of times the processing has been performed for the received query.

In one embodiment of the invention, the selection function comprises determining, for each document in the initial group of ranked documents, the classification of the document. Then, when a threshold percentage of the set of documents belong to a first classification (e.g., a family friendly category), all sets of ranked candidate terms that belong to documents that are members of a second classification (e.g., a non family friendly category) are not used to form the subset of candidate terms.

Hardware Overview

Figure 4:
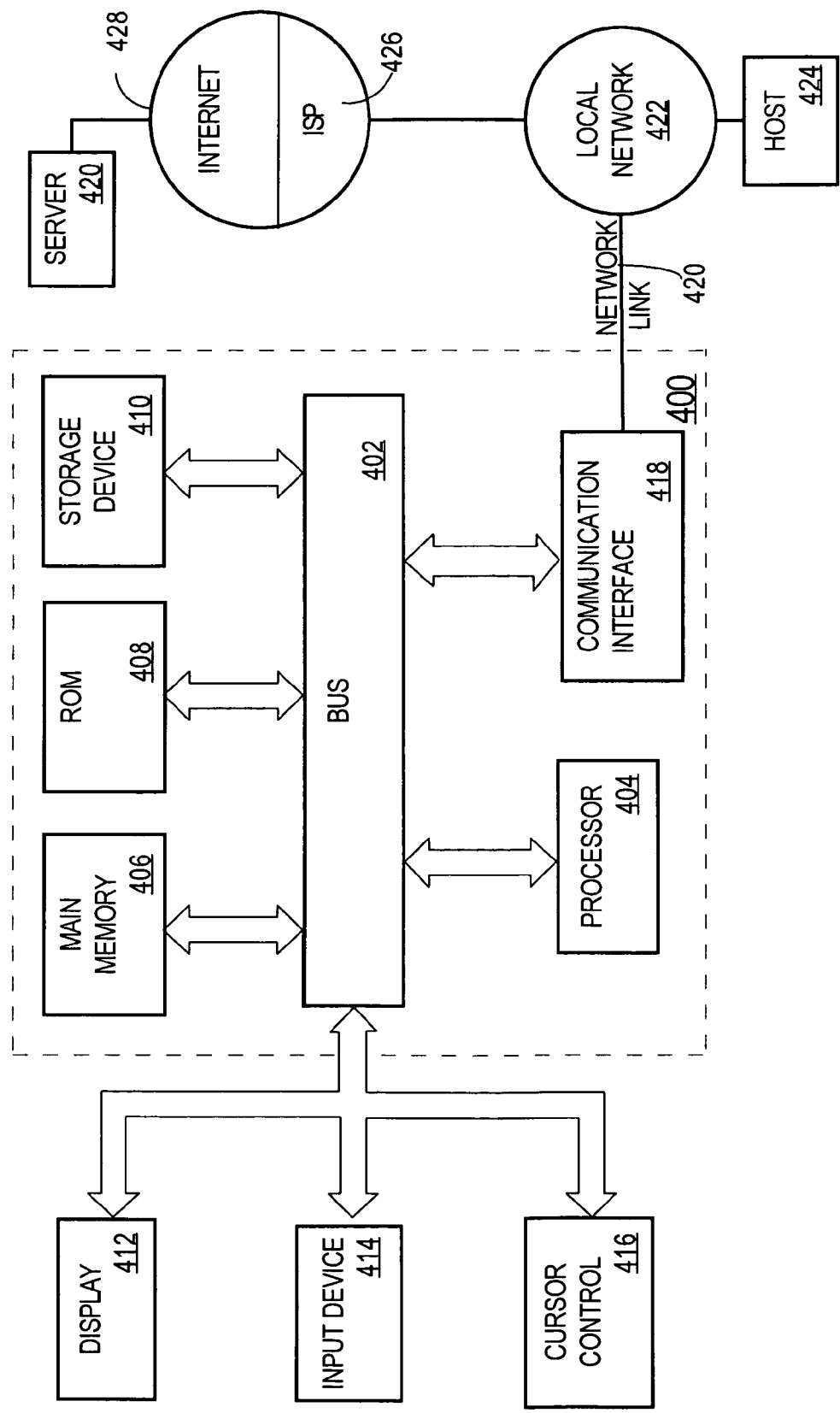
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Embodiments of the invention may be implemented on a variety of computing devices, including personal computers, personal digital assistants (PDAs), and cell phones, among other computing devices.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the of such claim in any way. The specification and drawings are, accordingly, to be regarded in an illustrative rather than a restrictive sense.

What is claimed is:

1. A method comprising:
   a computer processor determining a first key concept of a particular document;
   in response to receiving a search query from a user, the computer processor generating search results that include a search result listing for said particular document;
   the computer processor generating said search result listing for said particular document by creating a summary of said particular document that is less than all of said particular document;
   wherein generating said summary comprises the computer processor selecting, from said particular document, and including, in said summary, one or more excerpts that each contain both (a) said first key concept and (b) one or more non-key concept words that are within a specified proximity of an occurrence of said first key concept in said particular document;
   sending, toward an application, a search results page that comprises (a) one or more search result listings for one or more of the search results and (b) one or more key concepts for each of one or more of the search result listings;
   after sending said search results page toward said application, receiving, from said application, a request that specifies (a) a particular search result listing of said one or more search result listings sent toward said application and (b) a second key concept of said one or more key concepts sent toward said application; and
   in response to receiving the request, sending, toward the application, a particular summary for the particular search result listing, wherein the particular summary is generated based on the second key concept without regard to the query terms and without regard to the first key concept.

2. The method of claim 1, wherein sending the particular summary comprises sending the particular summary in a manner that causes the application to display the particular summary without reloading the search results page.

3. The method of claim 1, wherein sending the particular summary comprises sending the particular summary without re-sending any portion of the search results page.

4. The method of claim 1, wherein the search results page comprises a mechanism that causes a portion of a display of the particular search result listing to be replaced with the particular summary.

5. The method of claim 1, wherein the search results page comprises a mechanism that causes the particular summary to appear in the particular search result listing in response to the application receiving the particular summary.

6. The method of claim 1, further comprising:
   determining whether a particular device from which the search query originated is a mobile device;
   if the particular device is not a mobile device, then generating the summary that has a first specified length; and
   if the particular device is a mobile device, then generating the summary that has a second specified length that is greater than the first specified length.

7. The method of claim 1, wherein at least a particular portion of the search result listing is selected for inclusion in said search result listing based on said particular portion matching a pattern for at least one of: (a) a telephone number, (b) a street address, (c) an e-mail address, (d) a personal name, (e) a business name, and (f) a named entity.

8. The method of claim 1, wherein determining the first key concept comprises automatically extracting one or more key concepts from the particular document.

9. The method of claim 8, wherein automatically extracting the one or more key concepts from the particular document comprises automatically extracting the one or more key concepts from the particular document based at least in part on Prisma technology.

10. The method of claim 1, wherein determining the first key concept comprises automatically extracting one or more key concepts from the particular document, wherein the one or more key concepts include addresses, names, and other named entities.

11. The method of claim 1, wherein determining the first key concept comprises automatically extracting one or more key concepts that are identified by an author of the particular document.

12. A method comprising:
   a computer processor determining two or more different key concepts of a particular document;
   wherein the two or more different key concepts include at least a first key concept and a second key concept;
   in response to a search query, the computer processor generating search results;
   wherein the search results include a search result listing for said particular document;
   wherein the search result listing begins at a particular location on a search results page;
   wherein the search result listing includes two or more user-selectable elements for each of the two or more different key concepts;
   in response to a user's selection of a first element of the two or more elements, the computer processor causing a first summary, which contains multi-word excerpts that each contain both (a) an occurrence of said first key concept in said particular document and (b) one or more non-key concept words that occur within a specified proximity of that occurrence of said first key concept in said particular document, to be displayed in said search result listing beginning at the particular location on the search results page; and
   in response to a user's selection of a second element of the two or more elements, the computer processor causing a second summary, which contains multi-word excerpts that each contain both (a) an occurrence of said second key concept in said particular document and (b) one or more non-key concept words that occur within a specified proximity of that occurrence of said second key concept in said particular document, to be displayed in said search result listing beginning at the particular location on the search results page;
   wherein said first summary differs from said second summary; and wherein the step of generating search results comprises selecting said particular document from among a plurality of documents for inclusion within said search results due to said particular document containing one or more terms of said search query, but not due to said particular document containing either first key concept or said second key concept.

13. A machine-readable storage medium that stores instructions which, when executed by one or more processors, cause the one or more processors to perform the method of claim 1.

14. A machine-readable storage medium that stores instructions which, when executed by one or more processors, cause the one or more processors to perform the method of claim 2.

15. A machine-readable storage medium that stores instructions which, when executed by one or more processors, cause the one or more processors to perform the method of claim 3.

16. A machine-readable storage medium that stores instructions which, when executed by one or more processors, cause the one or more processors to perform the method of claim 4.

17. A machine-readable storage medium that stores instructions which, when executed by one or more processors, cause the one or more processors to perform the method of claim 5.

18. A machine-readable storage medium that stores instructions which, when executed by one or more processors, cause the one or more processors to perform the method of claim 6.

19. A machine-readable storage medium that stores instructions which, when executed by one or more processors, cause the one or more processors to perform the method of claim 7.

20. A machine-readable storage medium that stores instructions which, when executed by one or more processors, cause the one or more processors to perform the method of claim 8.

21. A machine-readable storage medium that stores instructions which, when executed by one or more processors, cause the one or more processors to perform the method of claim 9.

22. A machine-readable storage medium that stores instructions which, when executed by one or more processors, cause the one or more processors to perform the method of claim 10.

23. A machine-readable storage medium that stores instructions which, when executed by one or more processors, cause the one or more processors to perform the method of claim 11.

24. A machine-readable storage medium that stores instructions which, when executed by one or more processors, cause the one or more processors to perform the method of claim 12.

25. The method of claim 1, wherein said step of generating said summary is performed without regard to query terms in said search query; wherein said step of generating search results is performed by selecting, for inclusion within the search results, only documents that contain at least one query term from the search query received from the user; wherein said search results do not refer to any documents other than the documents that contain at least one query term from the search query received from the user.

26. A machine-readable storage medium that stores instructions which, when executed by one or more processors, cause the one or more processors to perform the method of claim 25.

\* \* \* \* \*